Patented Sept. 20, 1938

2,130,415

UNITED STATES PATENT OFFICE 2,130,415

ART OF DYEING

Arthur J. Buchanan, Charlotte, N. C., assignor, by mesne assignments, to Southern Dyestuff Corporation, Charlotte, N. C., a corporation of North Carolina No Drawing. Application April 14, 1936, Serial No. 74,246

1 Claim. (Cl. 8—6)

This invention relates to improvements in the art of dyeing with sulphur or sulphurized dyestuffs, and more particularly to the production of concentrated solutions of such dyestuffs, and it includes an improved method of making such solutions and the concentrated liquid sulphurized dyestuffs resulting therefrom.

The sulphur or sulphurized dyestuffs are generally speaking insoluble or sparingly soluble in water, but they are soluble in solutions of sodium sulphide. In order to use these colors for dyeing purposes it is necessary that they be reduced and made soluble. It is also important that these colors, after being reduced and dissolved, remain in solution in the reduced state until the dyeing operation is complete.

The usual procedure in applying sulphur dyestuffs to the fiber is to reduce and dissolve the dyestuff in a solution of sodium sulphide, or a solution of sodium sulphide and an alkali such as sodium carbonate. Other or additional reducing and solubilizing agents are sometimes used, either alone or with sodium sulphide. The dissolved and reduced dyestuffs are subsequently diluted and the cotton or other fabric or fiber immersed in the liquor, with subsequent exposure to the air, etc. In dyeing cotton, for example, the cotton is commonly immersed in the dye liquor at a temperature near the boiling point for a suitable period of time, e. g., around one hour, followed by exposure to the air, etc.

The preparation of dye liquors by reducing and dissolving the sulphurized dyestuffs with sodium sulphide, or with sodium sulphide and alkali, has certain well known and commonly recognized objections. The solutions are strongly alkaline and have the disadvantage of removing the natural waxes and fats from vegetable and animal fibers and tend to leave the dyed material depleted in these constituents and with a harsh texture, unlike the softness of texture of the original undyed material. Sodium sulphide, when used as a reducing and dissolving agent for the sulphur colors, also has the objection that it is readily oxidized by the air, thus tending to lose its value for keeping the dyestuff in a state of reduction and in solution. Sodium sulphide crystallizes from strong solutions and is consequently difficult to filter in high concentrations.

In an attempt to overcome the objections to the use of sodium sulphide in preparing reduced solutions of sulphur dyes, it has been proposed to reduce the high alkalinity of the dye solution, for example, by the use of sodium bisulphite, sodium hydrosulphite, glucose, salts of ammonia, etc.; in which case the sulphur dyestuff is first reduced and dissolved in a highly alkaline solution of sodium sulphide and the alkalinity of the solution is subsequently reduced in an attempt to prevent or minimize injury to the fibers and other objectionable effects of strongly alkaline dye liquors.

The present invention provides an improved method of dissolving and reducing sulphurized dyestuffs, and improved concentrated solutions of such dyestuffs in which the dissolving and reducing is accomplished by the use of a solution of sodium sulphide and sodium hydrosulphide of materially lower alkalinity and pH value than sodium sulphide solutions.

Sodium hydrosulphide has heretofore been used by manufacturers of sodium sulphide as a raw material in making solutions of sodium sulphide, by the addition of caustic soda thereto in sufficient amount to convert the sodium hydrosulphide to sodium sulphide; but the solutions of sodium sulphide so produced are of high alkalinity and have the objections above referred to. In the present process, the sodium hydrosulphide may be in part converted into sodium sulphide by the addition of caustic soda; but the sodium hydrosulphide is retained in substantial amount in the solution so that the solution is a composite solution of sodium sulphide and sodium hydrosulphide.

The use of such a composite solution of sodium hydrosulphide and sodium sulphide enables improved results to be obtained as compared with the use of sodium sulphide solutions; and makes unnecessary the addition of neutralizing agents for neutralizing the excess and objectionable alkalinity of sodium sulphide solutions.

The dissolving and reducing of sulphurized dyestuffs with a composite solution of sodium hydrosulphide and sodium sulphide gives improved results, as compared with the use of a solution of sodium sulphide, the resulting dyeings being somewhat brighter, bloomier, and fuller and more even than when solutions of sodium sulphide are used; and there is less tendency toward tendering of the fiber, while other objections incident to the use of sodium sulphide alone are overcome or minimized.

The use of composite solutions of sodium hydrosulphide and sodium sulphide gives directly a solution of the reduced dye which is less caustic and more stable toward air oxidation than sodium sulphide solutions. The dyestuffs are more easily kept in solution in the composite solution and can be more easily handled in a more concentrated solution. Such solutions, as above pointed out, are materially less alkaline and of a lower pH than solutions in sodium sulphide, or sodium sulphide with added alkali.

The proportions of sodium sulphide and sodium hydrosulphide can be varied but a substantial amount of sodium hydrosulphide is used and the solutions have a materially lower alkalinity and pH value than do sodium sulphide solutions. The composite solutions can be readily obtained by the addition of a regulated and limited amount of caustic soda to commercial sodium hydrosulphide solution, leaving a substantial part of the sodium hydrosulphide unchanged.

Sodium hydrosulphide is commercially available, e. g., in solutions containing about 30% sodium hydrosulphide, and such solutions can readily be converted into composite solutions of sodium hydrosulphide and sodium sulphide by a regulated and limited addition of caustic soda thereto.

The new composite dye liquors or solutions are available for dyeing textile fibers and fabrics of various kinds and particularly advantageous for use in dyeing cotton fibers and fabrics.

Highly concentrated solutions of sulphur colors can be prepared with relative ease by dissolving and reducing them in the composite solution of sodium hydrosulphide and sodium sulphide, and such highly concentrated solutions can be readily filtered, stored, transported and used.

The concentrated solutions can be handled much the same as sodium sulphide solutions of the dyestuffs are handled, but with added advantages, such as those above mentioned. The concentrated solutions can, for example, be diluted and the fibers or fabrics dyed therein and the dyestuffs exhausted by the addition of sodium chloride, sodium sulphate, ammonium sulphate, sodium hydrosulphite, sodium bisulphite, etc.

The sulphur dyestuffs are commonly marketed in the form of powders, usually admixed or diluted with more or less salt. Additional salt can be added to aid in the dyeing operation and in exhausting the dye bath. It is common to add a small amount of soda ash or caustic soda to the dye bath; and such alkalines in small amount can be added in the practice of the present process.

A particularly valuable application of the invention results from the use of the moist press-cake which is produced in the manufacture of sulphur dyes, and without the drying of the dyes to produce a dry powder. Such moist dyestuff press-cakes are readily dissolved and reduced in a strong composite solution of soduim hydrosulphide and sodium sulphide, and the resulting solutions are particularly advantageous for use in the dyeing of textile fibers and fabrics. The use of fresh, moist press-cake and its reduction and dissolving in the composite solution eliminates or minimizes the changes which take place on drying of the press-cake to form dry dye powders. Solutions of the sulphurized dyes can be more readily and advantageously prepared by using the moist press-cake than by using the dried dyestuffs which are produced by the drying of the press-cake and which are generally less soluble and less readily dissolved and reduced.

The new composite solutions of the sulphurized dyestuffs are materially less alkaline and have a materially lower pH value than sodium sulphide solutions of such dyestuffs. They are in general more stable and less readily oxidized than sodium sulphide solutions, and in general give superior and more uniform and dependable results.

The new composite solutions of the sulphur dyes are readily prepared without the use of neutralizing agents such as have heretofore been added to sodium sulphide solutions to reduce their alkalinity. The new dye solutions can thus be prepared free or relatively free from sulphites or bisulphites or other added neutralizing agents.

The invention will be further illustrated by the following specific examples, but it will be understood that the invention is not limited thereto, since different sulphur or sulphurized dyestuffs can be employed, and somewhat varying amounts and strengths of solutions of sodium hydrosulphide and sodium sulphide as well as somewhat varying proportions of these constituents. The following examples are typical:

Example 1.—100 pounds of commercial sulphur black in the form of a dry powder having common salt admixed therewith for standardization are dissolved in from 125 to 200 pounds of a composite solution of sodium hydrosulphide and sodium sulphide containing approximately equal amounts of the hydrosulphide and sulphide in amount sufficient to give a solution of about 30% strength and at a temperature of about 80° C., with accompanying reduction of the dyestuff. At this temperature and concentration the solution can be readily filtered, decanted, etc., to remove insoluble, objectionable matter and a strong, stable solution of the dyestuff thus obtained suitable for storage and transportation or ready for use, by dilution, etc. in making a dye bath for dyeing textile fibers or fabrics. On cooling of the solution to ordinary temperatures the dyestuff remains in solution, and is ready for use, after dilution, etc.

Example 2.—100 pounds of sulphur blue in the form of a dry powder having salt admixed therewith for standardization are dissolved in from 125 to 200 pounds of a composite solution such as referred to in Example 1 and the process is otherwise carried out in a manner similar to that described in Example 1.

Example 3.—A sulphurized dyestuff, such as sulphur black or sulphur blue, etc., is used in the form of a moist press-cake containing e. g., around 45% of water; and 100 pounds of this press-cake is dissolved in from 125 to 200 pounds of a 30% solution, containing approximately equal proportions of sodium hydrosulphide and sodium sulphide. The dissolving and reduction take place more readily in this case than with the dry sulphurized dye powder, and somewhat improved dye solutions are thus obtained without the necessity of isolating and drying the sulphur dye and subsequent handling of dry dye powders with their well known objections due to dusting, and the irritating or toxic effect of the dust, etc.

Example 4.—The crude thionation melt resulting from the fusion of suitable organic materials with sulphur or sodium polysulphide in the production of sulphurized dyestuffs is first dissolved in a caustic soda solution using for example 50 pounds of the sulphurized dyestuff melt and dissolving it in 60 pounds of a 50% caustic soda solution. This gives a solution which contains some excess caustic soda and which may contain some sodium sulphide. To this solution is added 200 pounds of a 30% sodium hydrosulphide solution to bring about the reduction of a dissolved dyestuff. The sodium hydrosulphide is in part converted into sodium sulphide by the excess caustic present to give a composite solution equivalent to approximately 200 pounds sodium sulphide solution and 100 pounds sodium hydrosulphide solution, each of 30% strength, in which composite solution the reduction of the dyestuff is accomplished.

In the process of Example 4 the composite solution of sodium sulphide and sodium hydrosulphide is employed for the reduction of the previously dissolved sulphurized dye; and this procedure is an advantageous one in that it enables the crude thionation melt from the fusion process in which the sulphur dye is produced to be directly dissolved in caustic alkali and the solution then directly reduced to give a concentrated solution of the reduced dye in the composite sulphide-hydrosulphide solution.

The solutions produced in accordance with the above examples are typical and may be used with or without additional substances, by dilution, etc., in making dye liquors or dye baths for dyeing and printing textile fibers and fabrics. The proportions of sulphide and hydrosulphide can be varied, the amount of sodium sulphide being sufficient to obtain the advantages resulting from the presence of this chemical while materially reducing the objections to the use of sodium sulphide alone; and the amount of sodium hydrosulphide being substantial and giving the advantages of a composite dissolving and reducing liquor of materially lower alkalinity and pH value than sodium sulphide solutions, whereby advantage is taken of the reducing and dissolving action of the sodium hydrosulphide as well as of the sodium sulphide.

It is one advantage of the new composite dye liquors that lower temperatures can be used in the dyeing process than with sodium sulphide solutions of the sulphur dyes.

The above examples can be varied, e. g., in the sulphurized dyestuffs employed and in the particular proportions of dyestuff and hydrosulphide and sulphide used in the solution as well as in the strength of the solution and in the addition of small amounts of other constituents or of added salts to aid in exhausting the dye bath, etc., without departing from the invention.

I claim:

Liquid sulphur dye, being a concentrated, filterable solution of sulphurized dyestuffs, comprising a sulphurized dyestuff dissolved and reduced in a concentrated composite solution of sodium sulphide and sodium hydrosulphide, in which the ratio of sodium sulphide to sodium hydrosulphide is from about 1:1 to 2:1, said liquid dye solution containing from about 16% to about 45% of the sulphurized dyestuff, and being characterized by improved stability toward oxidation and by relatively low pH value.

ARTHUR J. BUCHANAN.